United States Patent [19]

MacGregor

[11] 4,201,636

[45] May 6, 1980

[54] ELECTROCHEMICAL DESTRUCTION OF STABLE COMPLEXES

[75] Inventor: John J. MacGregor, Reading, England

[73] Assignee: Matthey Rustenburg Refiners (Pty) Limited, Johannesburg, South Africa

[21] Appl. No.: 31,605

[22] Filed: Apr. 19, 1979

Related U.S. Application Data

[63] Continuation-in-part of Ser. No. 942,814, Sep. 15, 1978, which is a continuation of Ser. No. 815,005, Sep. 12, 1977, Pat. No. 4,127,458.

[30] Foreign Application Priority Data

Jul. 13, 1976 [GB] United Kingdom ............... 29093/76
Oct. 12, 1978 [GB] United Kingdom ............... 42108/78

[51] Int. Cl.² .................................................. C25C 1/20
[52] U.S. Cl. ..................................... 204/109; 204/149; 204/152
[58] Field of Search ................. 204/109, 47, 149, 152, 204/96, 290 R

[56] References Cited

U.S. PATENT DOCUMENTS

| | | | |
|---|---|---|---|
| 3,244,605 | 4/1966 | Hotchkiss et al. | 204/109 X |
| 3,649,485 | 3/1972 | Chisholm | 204/290 R L |
| 3,674,675 | 7/1972 | Leaman | 204/290 R |
| 3,778,307 | 12/1973 | Beer | 204/290 F X |
| 3,784,456 | 1/1974 | Otto | 204/149 X |
| 3,970,531 | 7/1976 | Recht | 204/152 X |

*Primary Examiner*—Arthur C. Prescott
*Attorney, Agent, or Firm*—Cushman, Darby & Cushman

[57] ABSTRACT

This invention relates to the treatment of effluents; more particularly it relates to the destruction of compounds or complexes which are normally very stable and which pose problems in the purification and control of effluents.

Specifically, the process for recovering metal present as a stable complex in an aqueous effluent comprises the steps of:

(a) adjusting the pH of the effluent as necessary to a pH of 6±0.5;
(b) removing by filtration a substantial quantity of base and amphoretic metals from the so treated effluent of step (a);
(c) heating the filtrate from step (b) to a temperature in the region of 70° C.;
(d) electrolyzing the heated filtrate from step (c) at a substantially constant temperature maintained at least at 70° C. so as to destroy the stable complexes and thereby precipitate the said metals in the form of hydrated oxides or hydroxides, and
(e) filtering-off said precipitate.

8 Claims, 1 Drawing Figure

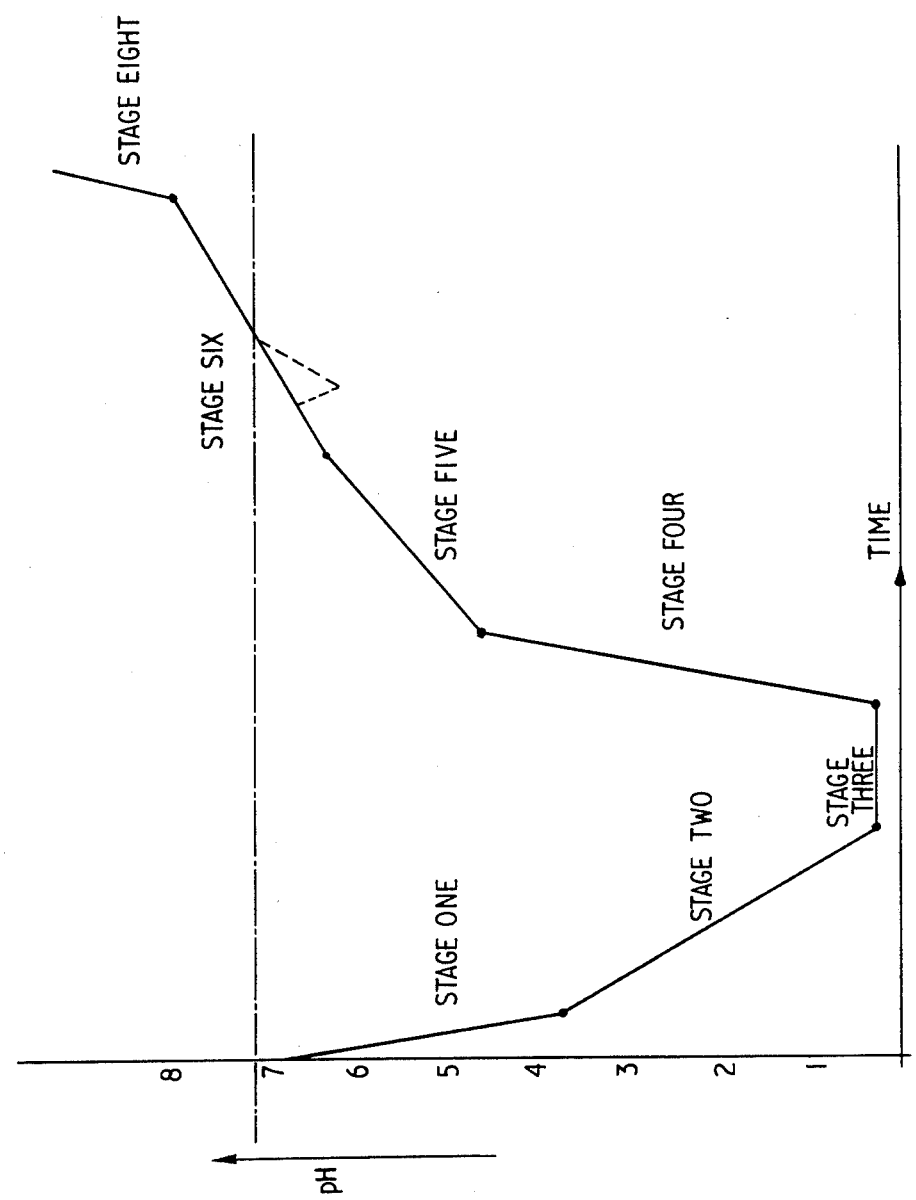

ELECTROCHEMICAL DESTRUCTION OF STABLE COMPLEXES

This application is a continuation-in-part application of U.S. Ser. No. 942,814 filed Sept. 15, 1978 which is a continuation of U.S. Ser. No. 815,005 filed Sept. 12, 1977 and issued under U.S. Pat. No. 4,127,458 on Nov. 28, 1978.

This invention relates to the treatment of effluents; more particularly it relates to the destruction of compounds or complexes which are normally very stable and which pose problems in the purification and control of effluents.

Certain very stable and water soluble compounds of metals are sometimes encountered which resist all normal chemical and electrochemical attempts to remove them from solution. These compounds usually occur only in small proportion relative to the total content of the compounded element. They are normally only detected as the difference in the results between analyses based on a whole sample, and analyses involving concentration steps other than evaporation. These stable compounds escape the concentration step and are therefore lost. These differences are usually explained as experimental error.

In the case of e.g. the platinum group metals, the high intrinsic value of the elements makes recovery worthwhile. In other cases the recovery may be required to prevent the infringement of discharge limits. It is therefore the object of this invention to destroy these stable complexes and thereby permit the recovery of the small traces of metals which are not usually recoverable.

In the course of work to recover the values from the effluent from a platinum refinery, it was found that all the possible methods which gave excellent results on synthetic solutions failed to do so when the actual effluent was treated. After treatment the apparently barren effluent was found by spectroscopic examination to contain up to 100 mgl$^{-1}$ of various precious metals in solution. A method for recovering these traces of the platinum group metals has been described in U.S. Pat. No. 4,127,458 but experience has however shown that the method is no longer adequate. Changes in the refinery technique have resulted in changes in type and proportion of the stable complexes in the effluent. This present invention provides a more general treatment which is successful in destroying all the classes of stable complexes so far encountered. The method is best applied to effluent streams which have received no previous recovery treatments.

According to this invention all the aqueous discharges likely to contain platinum group metals are collected and mixed together under controlled conditions. Additions of acid, usually hydrochloric acid or alkali, usually sodium hydroxide of sodium carbonate, are made to bring the mixture to pH 6±0.5. The bulk of the base metals such as iron, copper and nickel and amphoteric metals such as As, Sb, Sn, Zn, Se and Te are then removed by filtration as their hydroxides, oxychlorides etc. The filtrate is variable in composition but usually contains 500-1500 mgl$^{-1}$ of the platinum group metals, up to several hundred milligrams 1$^{-1}$ of copper nickel and zinc as ammines and also traces of other metals. Sodium chloride is present usually in the range 5000 to 20,000 mgl$^{-1}$ together with ammonium salts. Other water soluble salts are also present in small quantity.

The filtrate is taken at pH 6±0.5 and heated to 70° C. It is then electrolysed at more than 8 V across the cell. During the electrolysis the pH of the electrolyte changes, as will be explained later. Electrolysis is continued until the pH rises to pH 8.0. The destruction of the stable complexes is then complete. The temperature is maintained at at least 70° C. throughout the electrolysis. Although some metal is deposited at the cathode, the majority is precipitated in the form of highly oxidised hydrated oxides or hydroxides. The products are similar to those produced by the methods given in U.S. Pat. No. 3,806,591. This invention, therefore, also includes a method of preparation of a hydrated oxide or hydroxide of a platinum group metal by a process according to the present invention.

These products are readily decomposed in dilute acids and also slowly decomposed in sodium hydroxide. If the electrolysis is continued the pH will rise rapidly and at over pH8 some of the platinum group metals will be redissolved. The products are, therefore, recovered by filtration at pH8 leaving a liquor containing 5-15 mgl$^{-1}$ of mixed platinum group metals. These residual traces are no linger complexed in unreactive forms and may be recovered easily by any of the known techniques e.g. high contact area cathode electrolysis, spinning cathode electrolysis, or by chemical means such as sulphiding. Final discharges containing less than 0.5 mgl$^{-1}$ total platinum group metals are easily achieved.

The requirement for a minimum of 8.0 V across the cell poses the problem of the excessive passage of current leading to overheating and overloading the power source. This has been overcome by using one large and one very small electrode. It has been found to be advantageous to use a large anode and a small cathode, typically in a ratio between 60-1 and 120-1. A current density in the range 0.15 to 0.25 Acm$^{-2}$ on the anode results in voltages of 8-15 V across the cell at various stages of the electrolysis. These changes will be explained later.

The nature of the stable complexes is not known. It is believed that tetramine platinum II chloride and pentamine rhodium chloride are typical examples, but organic complexes are sometimes also present. Together these complexes make up approximately 10% to 20% of the platinum group metals content of the refinery effluent. As they are water soluble and chemically unreactive, their isolation from such small concentrations in such a complex system has not been attempted.

The FIGURE is a diagram showing the stages of eletrolysis according to the invention.

During the electrolysis a number of reactions take place in succession and are best understood with reference to the diagram. In the first stage electrolysis of uncomplexed metal salts gives cathode deposits and liberates acid. The pH falls slowly. This being a chloride system, the liberated hydrochloric acid is next decomposed to yield chlorine and hydrogen. The chlorine reacts with ammonia to form chloramine. At 70° C. or above chloramine will react with more chlorine or with itself to decompose to nitrogen and more hydrochloric acid

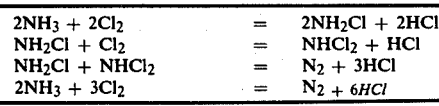

| | | |
|---|---|---|
| $2NH_3 + 2Cl_2$ | = | $2NH_2Cl + 2HCl$ |
| $NH_2Cl + Cl_2$ | = | $NHCl_2 + HCl$ |
| $NH_2Cl + NHCl_2$ | = | $N_2 + 3HCl$ |
| $2NH_3 + 3Cl_2$ | = | $N_2 + 6HCl$ | thus giving the rapid fall in pH in stage 2. Simple metal amine complexes are decomposed by similar reactions. Stage 3 of the electrolysis is simply the destruction of the liberated acid and the discharge of chlorine during which stage the pH remains very low. The cell voltage is also at a minimum.

When the acid is exhausted the reaction changes to effectively the electrolysis of sodium chloride. Chlorine liberation at the anode is replaced by the generation of hypochlorite ions $OCl^-$, and hydroxyl ions $OH^+$ are produced at the cathode. The pH and the cell voltage begin to rise, and the hypochlorite ions help to decompose the first type of stable compounds. This is demonstrated by the sudden increase in colour often observed at this stage. However, this effect is only seen provided the cell voltage is at least 8.0 V. The reactions do not occur in chemical simulations of this stage; or if the voltage in the cell is too low.

The pH continues to rise rapidly until at about pH 4.5. precipitation begins. The rate of increase of the pH slows down as hydroxyl ions are removed from the electrolyte to form the precipitate. Again, if the cell voltage is too low the desired reactions do not take place, and additions of alkali to the electrolyte at this stage do not give the desired destruction of the next type of stable complexes. Electrolysis must therefore be continued. At about pH 6.0 the rate of pH increase slows even more, and in some cases may show a temporary fall as indicated by dotted lines in the diagram. It is believed that organic amines are being destroyed at this stage. If the temperature is allowed to fall chloramines can once again be detected and black tarry deposits build up around the top of the cell. Again the destruction of the complexes only occurs if the voltage is high enough. The reactions at this stage continue until about pH7.5 when the rate of pH increase becomes rapid. The electrolysis is judged complete when pH8.0 is reached.

The time taken for each of the stages to be completed depends on the quantity of the compounds reacted at that stage present in the sample under test. In the variable discharge from the refinery, samples representing a weeks arisings were taken for each of twelve weeks, and showed total process times varying from 2 to 10 hours. The variation on individual stages was from 5 minutes to 6 hours. Howevery by electrolysing to pH8.0 recovery of the platinum group metal to leave less than 0.5 mgl$^{-1}$ in the final discharge was achieved in every case. However it was also shown that it is preferable for each and every stage to be allowed to proceed to completion in order to ensure substantially complete recovery of the platinum group metal values.

EXAMPLE 1.

One sample representing the weekly outflow from the refinery contained
Pt: 200 mgl$^{-1}$
Pd: 250 mgl$^{-1}$
Ir: 60 mgl$^{-1}$
Ru: 70 mgl$^{-1}$
Rh: 70 mgl$^{-1}$
Os: <10 mgl$^{-1}$
after hydrolysis to pH6±5 and filtration. This was electrolysed at 8.0 A using a 60 cm$^2$ anode and a Pt wire cathode. After 235 minutes the pH had resin again to pH8.0. After filtration of this stage the solution contained Pt: 7.8 mgl$^{-1}$
Pd: 0.16 mgl$^{-1}$
Ir: 1.58 mgl$^{-1}$
No other metals were detected.

Subsequent treatment with sulphide reduced those levels to 0.2 mgl$^{-1}$ of platinum only. A similar sulphide treatment on an unelectrolysed sample left a total of 27 mgl$^{-1}$ mixed platinum metals in solution.

EXAMPLE 2.

A sample representing a different weeks output from the refinery contained after hydrolysis and filtration
Pt: 130
Pd: 140
Ir: 10
Ru: 60
Os: <10
This was electrolysed under the same conditions as in the previous example but took seven hours to reach pH8.0. After filtration at this stage the solution contained 3.84 mgl$^{-1}$ of platinum only. Continued electrolysis with a large cathode area and 2.0 V across the cell reduced this to 0.25 mgl$^{-1}$.

EXAMPLE 3

A sample representing yet another weeks discharge from the refinery contained after hydrolysis and filtration
Pt: 210 mgl$^{-1}$
Pd: 1700 mgl$^{-1}$
Ir: 120 mgl$^{-1}$
Ru: 1720 mgl$^{-1}$
Rh: 1010 mgl$^{-1}$
Os: 10
Treated as in the previous example this took five hours to reach pH8.0. After filtration at this pH the solution contained
Pt: 11.0 mgl$^{-1}$
Rh: 0.11 mgl$^{-1}$
after continued electrolysis with a high cathode area these were reduced to Pt 0.17 mgl$^{-1}$.

From these examples it can be seen that the metal content of the solution has little bearing on the total time taken for the electrolysis. It should also be pointed out that without the electrolysis to pH8.0 all methods of recovery left between 5% and 25% of the original platinum metals in the solution.

What we claim is:

1. A process for recovering platinum group metal present as a stable complex in an aqueous effluent, the process comprising the steps of:
   (a) adjusting the pH of the effluent as necessary to a pH of 6±0.5;
   (b) removing by filtration a substantial quantity of the base and amphoteric metals from the so-treated effluent of step (a);
   (c) heating the filtrate from step (b) to a temperature in the region of 70° C.;
   (d) electrolysing the heated filtrate of step (c) at a substantially constant temperature maintained at least at 70° C. so as to destroy the stable complexes and thereby precipitate the platinum group metals in the form of hydrated oxides or hydroxides, and
   (e) filtering-off the said precipitate.

2. A process according to claim 1 wherein electrolysis of the filtrate in step (d) is continued until the pH of the filtrate reaches pH8.

3. A process according to claim 1 or 2 wherein electrolysis of step (d) is conducted at 8 V.

4. A process according to claim 3, wherein eletrolysis carried out in a cell including two electrodes one of which presents a relatively large area and the other electrode presents a relatively small area to the electrolyte.

5. A process according to claim 4 wherein the electrode which presents the relatively large area is the anode and the electrode which presents the relatively small area is the cathode.

6. A process according to claim 5 wherein the area presented to the electrolyte by the anode and the cathode fall within the range 60-1 and 102-1.

7. A process according to claim 6 wherein during electrolysis a current density within the range 0.15 and 0.25 A cm$^{-2}$ is maintained at the anode.

8. A process for recovering metal present as a stable complex in an aqueous effluent, the process comprising the steps of:
(a) adjusting the pH of the effluent as necessary to a pH of 6±0.5;
(b) heating the effluent to a temperature in the region of 70° C.;
(c) removing as a filtrate a substantial quantity of base and amphoteric metals from the so-heated effluent of step (b);
(d) electrolysing the filtrate of step (c) at a substantially constant temperature maintained at least at 70° C. so as to destroy the stable complexes and thereby precipitate the said metals in the form of hydrated oxides or hydroxides, and
(e) filtering off the said precipitate.

* * * * *

UNITED STATES PATENT AND TRADEMARK OFFICE
CERTIFICATE OF CORRECTION

PATENT NO. : 4,201,636
DATED : May 6, 1980
INVENTOR(S) : John J. MacGregor

It is certified that error appears in the above-identified patent and that said Letters Patent are hereby corrected as shown below:

In the heading of the patent, Item [63] and in Column 1, first paragraph, the filing date of Serial No. 815,005 should be --July 12, 1977-- rather than "Sept. 12, 1977"

Signed and Sealed this

Nineteenth Day of August 1980

[SEAL]

Attest:

SIDNEY A. DIAMOND

Attesting Officer

Commissioner of Patents and Trademarks